(12) United States Patent
Pych

(10) Patent No.: US 10,427,890 B2
(45) Date of Patent: Oct. 1, 2019

(54) MULTI-STRAND FLAT TOP CONVEYOR

(71) Applicant: Automatic Systems, Inc., Kansas City, MO (US)

(72) Inventor: Jeremy Adam Pych, Blue Springs, MO (US)

(73) Assignee: Automatic Systems, Inc., Kansas City, MO (US)

( * ) Notice: Subject to any disclaimer, the term of this patent is extended or adjusted under 35 U.S.C. 154(b) by 0 days.

(21) Appl. No.: 15/693,529

(22) Filed: Sep. 1, 2017

(65) Prior Publication Data

US 2018/0057275 A1 Mar. 1, 2018

Related U.S. Application Data

(60) Provisional application No. 62/382,500, filed on Sep. 1, 2016.

(51) Int. Cl.
| | |
|---|---|
| *B65G 47/64* | (2006.01) |
| *B65G 23/22* | (2006.01) |
| *B65G 17/40* | (2006.01) |
| *B62D 65/18* | (2006.01) |
| B65G 23/06 | (2006.01) |
| B65G 37/00 | (2006.01) |

(52) U.S. Cl.
CPC ............ *B65G 47/64* (2013.01); *B62D 65/18* (2013.01); *B65G 17/40* (2013.01); *B65G 23/22* (2013.01); *B65G 23/06* (2013.01); *B65G 37/005* (2013.01); *B65G 2201/0294* (2013.01); *B65G 2812/02306* (2013.01); *B65G 2812/02356* (2013.01)

(58) Field of Classification Search
None
See application file for complete search history.

(56) References Cited

U.S. PATENT DOCUMENTS

| | | | |
|---|---|---|---|
| 3,688,921 A * | 9/1972 | Zaha ..................... | E04H 6/14 198/441 |
| 3,927,705 A | 12/1975 | Cromeens et al. | |
| 4,356,908 A | 11/1982 | Embro, Jr. | |
| 4,974,722 A * | 12/1990 | Puppel ................ | B65G 19/10 198/731 |
| 5,322,156 A | 6/1994 | Kakita et al. | |
| 5,836,423 A | 11/1998 | Kunczynski | |
| 6,145,653 A | 11/2000 | Mensch | |
| 6,176,367 B1 | 1/2001 | Patrito | |
| 6,293,544 B1 | 9/2001 | Fedinatz | |
| 6,889,817 B2 | 5/2005 | Leisner | |

(Continued)

OTHER PUBLICATIONS

U.S. Appl. No. 62/382,491, filed Sep. 1, 2016, by Pych, entitled: "Multi-Strand Flat Top Conveyor.".

(Continued)

*Primary Examiner* — Kavel Singh
(74) *Attorney, Agent, or Firm* — Frost Brown Todd LLC

(57) ABSTRACT

A vehicle production assembly line includes a conveyor system to support a vehicle. The conveyor system includes a first side conveyor chain, a second side conveyor chain, and a middle conveyor chain positioned between the first side conveyor chain and the second side conveyor chain. The first side conveyor chain, the second side conveyor chain, and the middle conveyor chain are laterally aligned with each other and can be mechanically synchronized with a single motor.

20 Claims, 17 Drawing Sheets

(56) References Cited

U.S. PATENT DOCUMENTS

| | | | |
|---|---|---|---|
| 6,902,052 B2 | 6/2005 | Prentice et al. | |
| 6,966,431 B2 * | 11/2005 | Jaynes | B61B 10/02 |
| | | | 198/465.4 |
| 7,036,656 B2 | 5/2006 | Gariglio | |
| 7,278,533 B2 | 10/2007 | Horn | |
| 7,584,840 B2 | 9/2009 | Mishmash et al. | |
| 7,588,239 B2 | 9/2009 | Marcinik et al. | |
| 7,757,842 B1 | 7/2010 | Fortenbery et al. | |
| 8,919,536 B2 | 12/2014 | Paroth et al. | |
| 9,038,810 B2 | 5/2015 | Schroader | |
| 9,474,107 B2 | 10/2016 | Barreyre et al. | |
| 9,592,960 B2 | 3/2017 | Schafer | |
| 9,670,000 B2 | 6/2017 | Fujio | |
| 9,988,218 B2 | 6/2018 | Dugat et al. | |
| 10,150,455 B1 | 12/2018 | Gile et al. | |
| 2009/0277755 A1 * | 11/2009 | Spangler | B65G 43/10 |
| | | | 198/617 |
| 2010/0108467 A1 | 5/2010 | Barreyre et al. | |
| 2011/0168527 A1 | 7/2011 | Fatato et al. | |
| 2017/0291777 A1 | 10/2017 | Davi | |
| 2018/0057085 A1 | 3/2018 | Pych | |
| 2018/0279817 A1 | 10/2018 | Ishino et al. | |
| 2018/0319606 A1 | 11/2018 | Rieu | |

OTHER PUBLICATIONS

U.S. Appl. No. 62/382,500, filed Sep. 1, 2016, by Pych, entitled: "Multi-Strand Flat Top Conveyor.".

\* cited by examiner

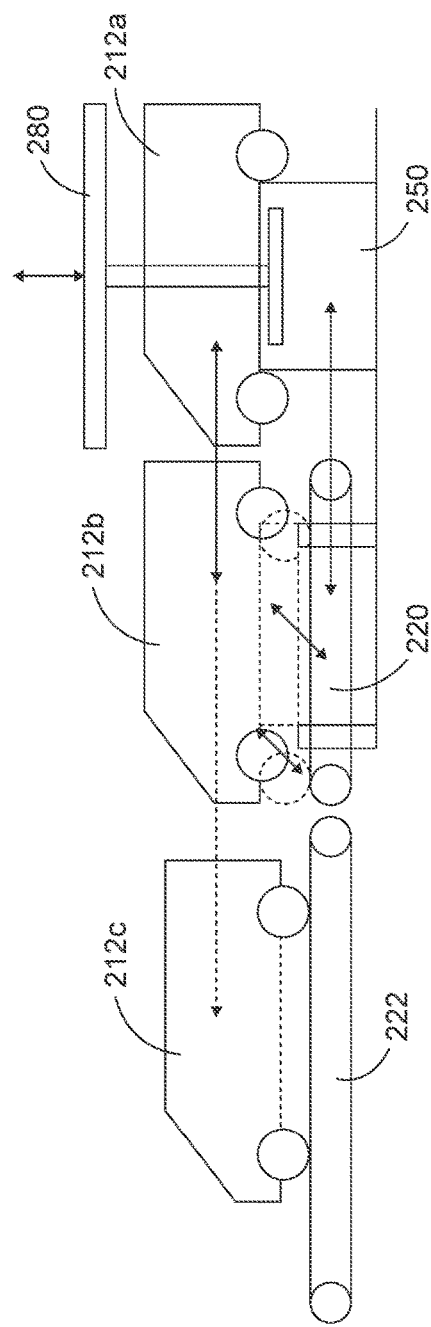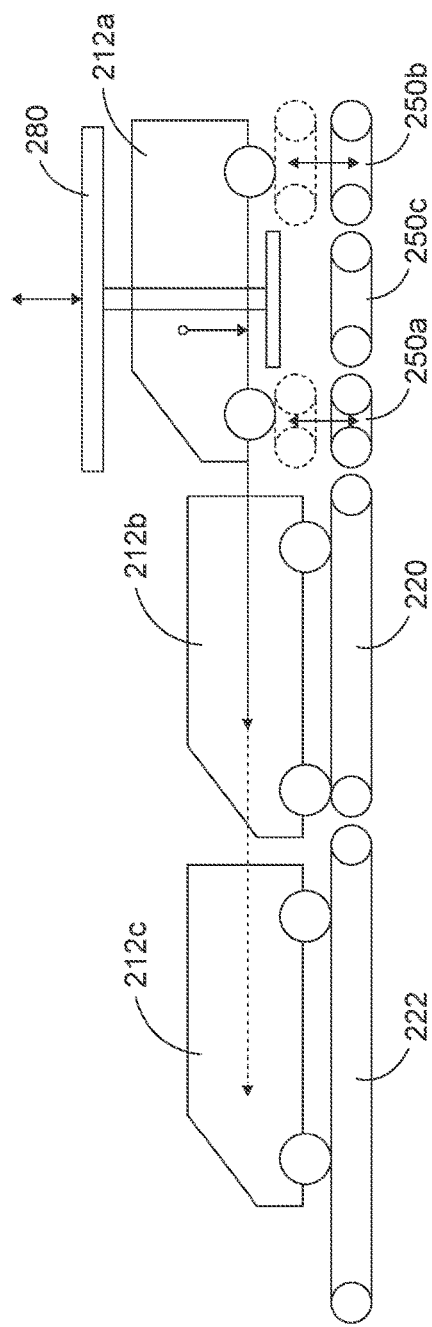

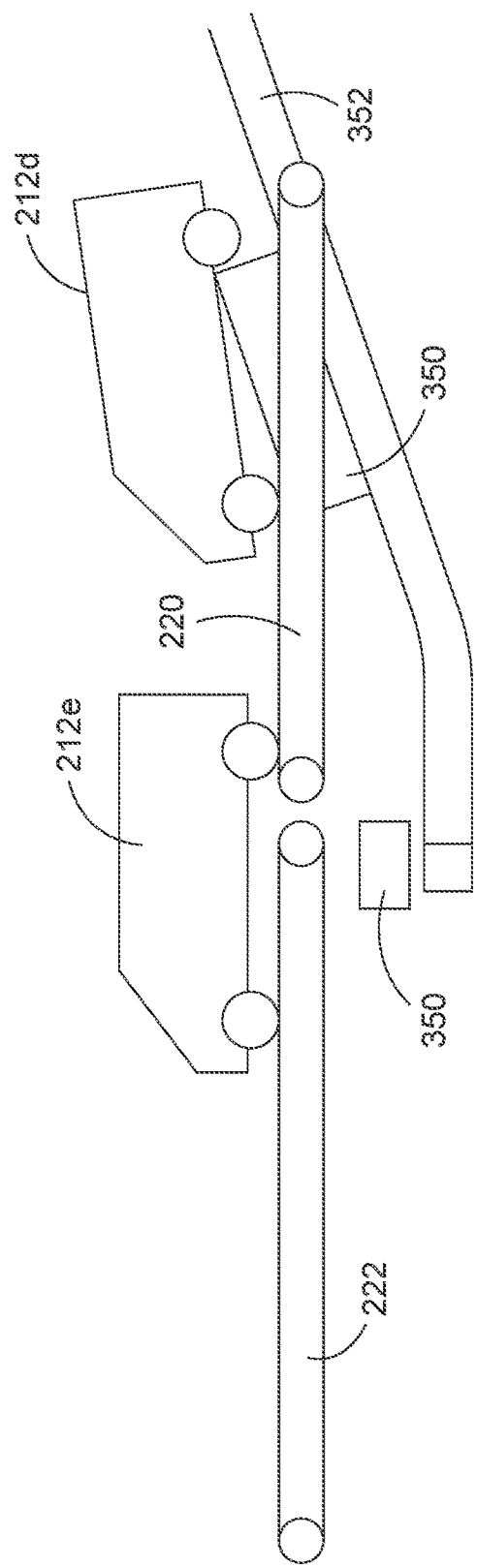

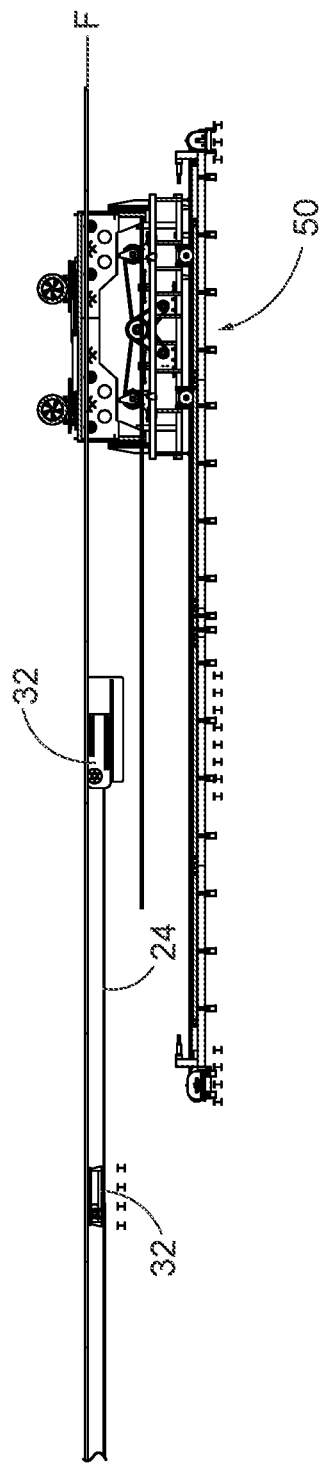

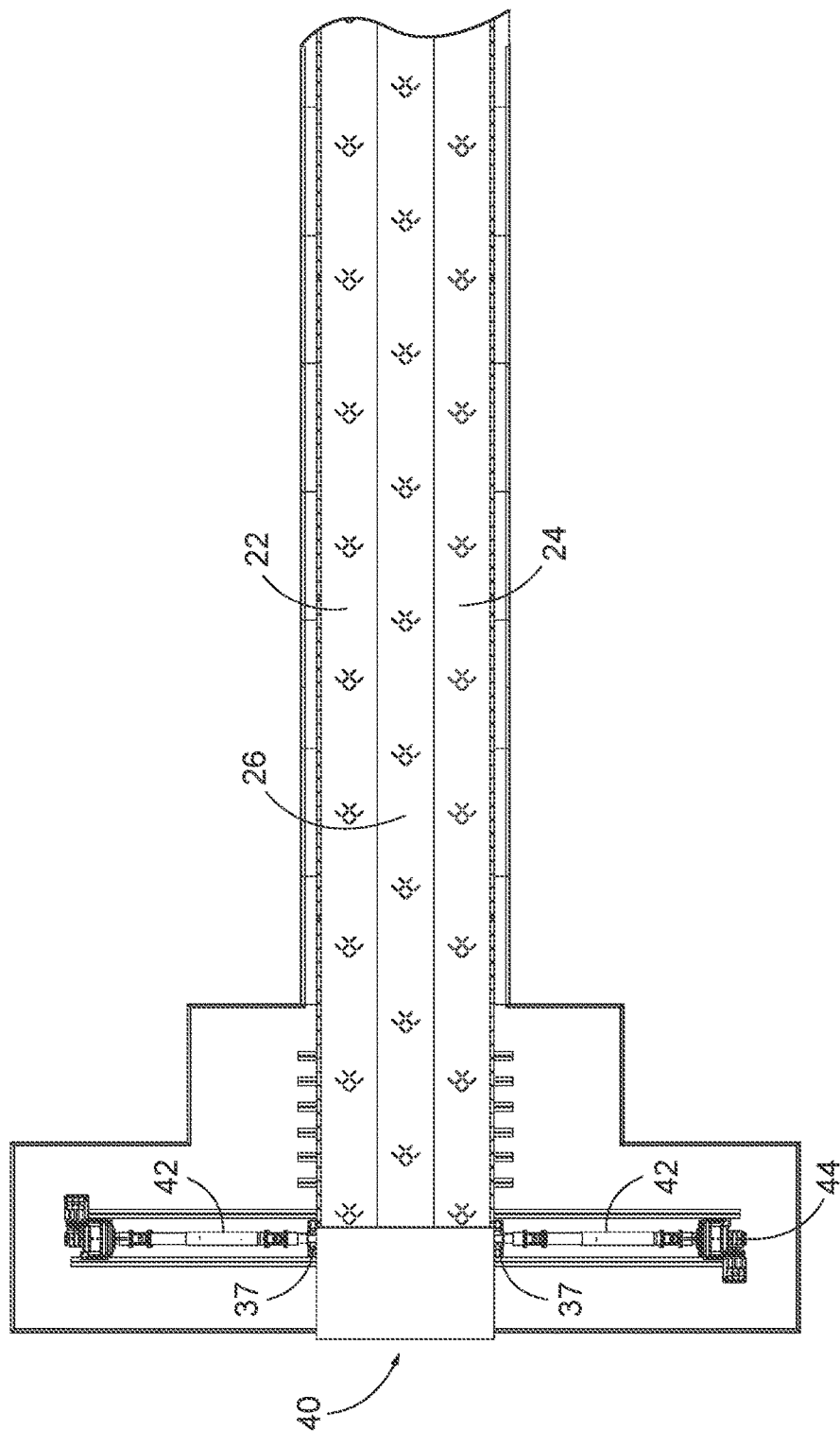

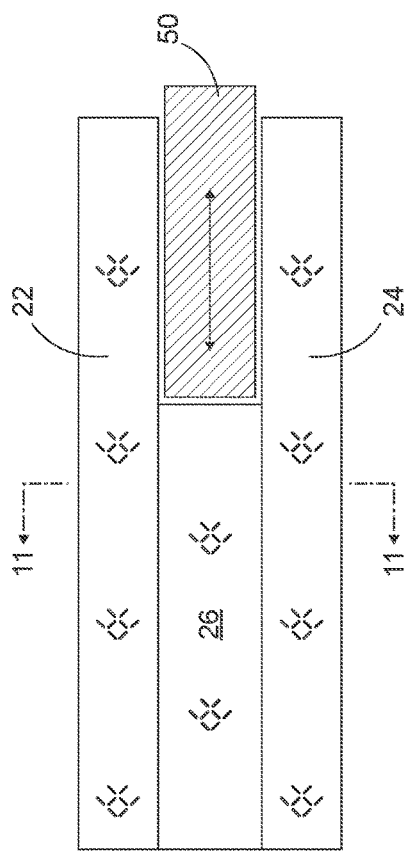
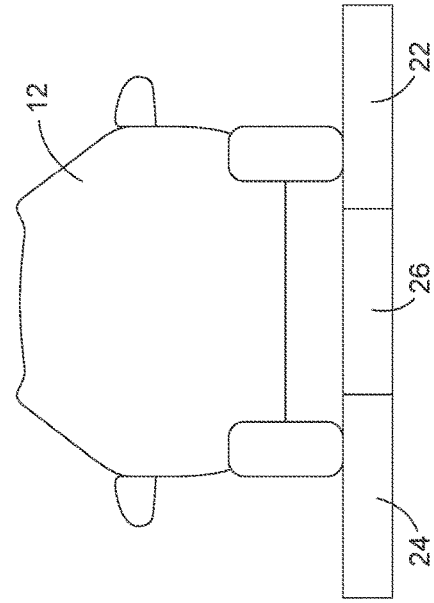

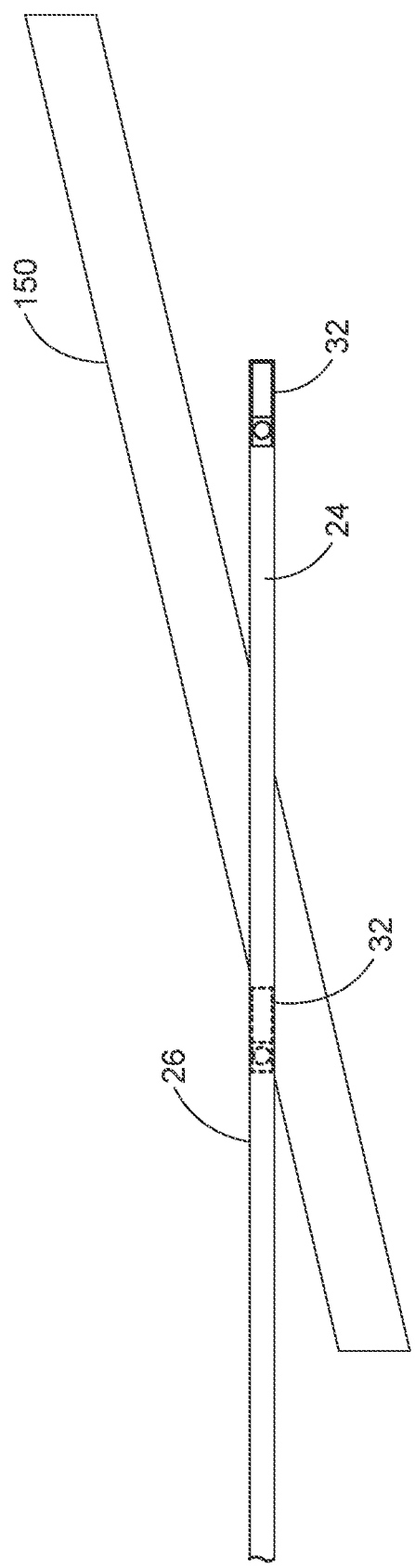

MULTI-STRAND FLAT TOP CONVEYOR

PRIORITY

This application claims priority to U.S. Provisional Patent Application No. 62/382,500, entitled "Multi-Strand Flat Top Conveyor," filed Sep. 1, 2016, the disclosure of which is incorporated by reference herein.

BACKGROUND

Assembly line processes can be used in the manufacture of a variety of items. For example, an assembly line process may be used to manufacture a vehicle. In the vehicle manufacturing context, certain systems, methods, and devices are needed to move the vehicle being made through various areas or stations within a plant. In this process, it may be beneficial or practical at times to transfer the vehicle being made from an undercarriage support to a wheel support on a flat top conveyor to provide access to the vehicle in production.

Typically, multiple conveyors are used in the manufacture of a vehicle to transfer the vehicle from an undercarriage support to a wheel support. One such exemplary system includes a conveyor having two flat top conveyor chains that are spaced apart to align with the wheels of the vehicle such that one chain is aligned with the right two wheels of the vehicle and the other chain is spaced to aligned with the left two wheels of the vehicle. Referring to FIG. 1A, an overhead carrier arm (280) is configured to support a vehicle (212a) from the undercarriage during assembly. The carrier arm (280) moves vertically to lower the vehicle (212a) onto a decking shuttle (250). The decking shuttle (250) supports the vehicle wheels. The decking shuttle (250) moves downstream at a faster rate to exit the carrier arm (280), then moves at a slower rate to synchronize with the first conveyor (220). This first conveyor (220) comprises two chains in a spaced apart configuration such that each chain aligns with the wheels of the vehicle (212b). The decking shuttle (250) operates between these two chains. After the decking shuttle (250) synchronizes with the first conveyor (250), it lowers the vehicle (212b) to set the tires on the first conveyor (220). Once the vehicle (212b) is positioned onto the conveyor (220), the decking shuttle vehicle tire support arms retract and lower between the chains of the conveyor (220). The first conveyor (220) then moves the vehicle (212c) further downstream to transfer it to a second conveyor (222). The second conveyor (222) is synchronized with the first conveyor (220). This second conveyor (222) comprises a single wide belt conveyor chain. This single wide belt conveyor allows workers to walk across the conveyor such that the workers can access all portions of the vehicle. Each conveyor of the assembly line is typically driven by a separate motor.

FIG. 1B shows another typical assembly line having multiple conveyors. In this embodiment, the overhead carrier arm (280) lowers the vehicle (212a) onto two decking conveyors (250a, 250b) with lifts that are configured to raise and/or lower. For instance, the overhead carrier arm (280) lowers the front wheels of the vehicle (212a) onto a first decking conveyor (250a) and the rear wheels of the vehicle onto a second decking conveyor (250b). When the carrier arm (280) lowers the vehicle (212a) onto the decking conveyors (250a, 250b), the decking conveyors (250a, 250b) may be in a raised configuration. The decking conveyors (250a, 250b) may then lower and drive the vehicle (212b) downstream to the next conveyor (220) having two chains in a spaced apart configuration. Another conveyor (250c) may be positioned between the decking conveyors (250a, 250b) to transition the vehicle (212b) downstream. The decking conveyors (250a, 250b) drive the vehicle (212b) at a faster pace. The two-chained conveyor (220) is synchronized with the decking conveyors (250a, 250b) to receive the vehicle (212b). As the two-chained conveyor (220) moves the vehicle (212b) downstream, the two-chained conveyor (220) slows to match the speed of the wide belt conveyor (222) that moves at a slower pace.

Another embodiment of an assembly line having multiple conveyors is shown in FIG. 1C. In this embodiment, an inverted carrier (250) is driven by an inverted conveyor (352) to lower a vehicle (212d) on a two-chained conveyor (220), instead of an overhead carrier arm (280). The chains of the two-chained conveyor (220) are in a spaced apart relationship to allow the inverted conveyor (352) to continue moving downstream, through the space between the chains, and underneath of the two-chained conveyor (220) as the inverted conveyor (352) positions the vehicle onto the two-chained conveyor (220). The two-chained conveyor (220) then drives the vehicle (212e) downstream, to a wide belt conveyor (222).

Because of the space between the two chains, it can be difficult to walk between the two conveyors to access all portions of the vehicle. In addition, it can be difficult to synchronize conveyor sections to transition the vehicle through an assembly line having more than one conveyor section. Accordingly, it may be desirable to provide a multi-strand flat top conveyor having a wide flat top conveyor section. This may allow production of the vehicle to be more efficient by allowing a worker to more easily and safely walk between the conveyors. This may further simplify the conveyor system by allowing the multi-strand conveyors to be driven by a single motor to mechanically synchronize the speed of the conveyors. A multi-strand flat top conveyor can also reduce the floor space and the cost to assemble a vehicle.

While a variety of systems, methods, and devices for assembly line processes have been made and used, it is believed that no one prior to the inventor(s) has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements.

FIG. 1A depicts a schematic of an assembly line having multiple conveyor sections.

FIG. 1B depicts a schematic of another assembly line having multiple conveyor sections.

FIG. 1C depicts a schematic of another assembly line having multiple conveyor sections.

FIG. 3 depicts a side elevational view of the tail section of the multi-strand flat top conveyor system with the decking shuttle of FIG. 2A.

FIG. 9 depicts a top plan view of the conveyor drive system of FIG. 8.

FIG. 10 depicts a schematic of the multi-strand flat top conveyor system of FIG. 2A.

FIG. 11 depicts a schematic of a vehicle positioned on the multi-strand flat top conveyor system of FIG. 2A.

FIG. 18 depicts a side elevational view of the assembly line of FIG. 17.

Figure 2A:
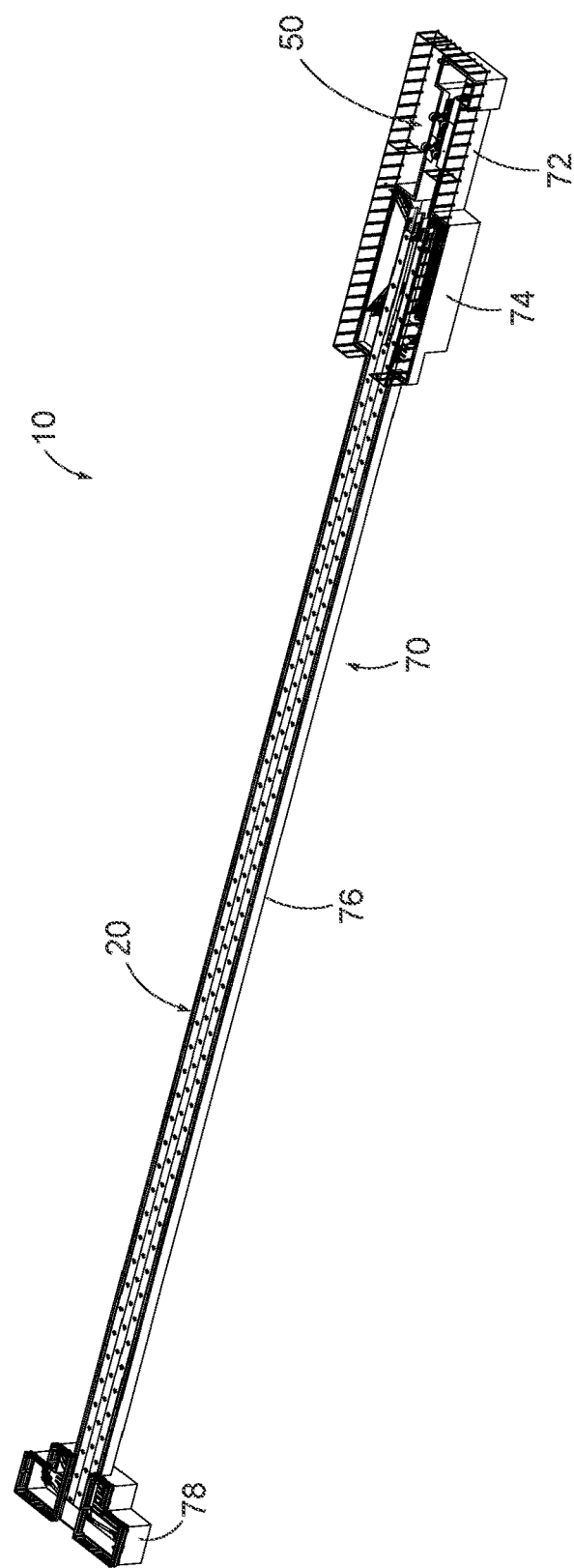
FIG. 2A depicts a top perspective view of an assembly line with a multi-strand flat top conveyor system and a decking shuttle.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

In some instances, it is desirable to have a multi-strand flat top conveyor system to transfer a vehicle from an undercarriage support to a wheel support. The multi-strand flat top conveyor system is a single conveyor section that uses a single motor to drive multiple chains along the conveyor system. The multi-strand flat top conveyor system provides a wide flat top conveyor portion to more efficiently manufacture the vehicle by allowing a worker to more easily and safely walk between the conveyors. The multi-strand flat top conveyor system further simplifies the conveyor system by allowing the chains of the multi-strand flat top conveyor system to be driven by a single motor to mechanically synchronize the speed of the chains. Accordingly, the multi-strand flat top conveyor system is more efficient and can reduce the floor space and the cost to assemble a vehicle.

FIGS. 2A-4 show a vehicle product assembly line (10) including a multi-strand flat top conveyor system (20), a transfer device (50), and a pit (70). The transfer device (50) is positioned upstream of the conveyor system (20) to transfer the vehicle from an undercarriage support lift to the conveyor system (20). Both of the transfer device (50) and the conveyor system (20) are positioned within the pit (70) to horizontally align the transfer device (50) and the conveyor system (20). In the present embodiment, the pit (70) is positioned to align the transfer device (50) and the conveyor system (20) at floor level (F), as best seen in FIG. 3. Accordingly, the pit (70) allows maintenance workers to more easily access the transfer device (50) and the conveyor system (20).

Referring to FIG. 2A, the pit (70) comprises a transfer device pit (72), a transfer pit (74), a conveyor pit (76), and a conveyor drive system pit (78). The transfer device pit (72) is configured to house the transfer device (50) and is sized to allow the transfer device (50) to translate within the transfer device pit (72). The transfer pit (74) is downstream and adjacent to the transfer device pit (72). The transfer pit (74) is configured to receive the transfer device (50) and a tail section, or downstream portion, of the multi-strand conveyor system (20) to allow the vehicle to be transferred from the transfer device (50) to the conveyor system (20). The conveyor pit (76) is downstream and adjacent to the transfer pit (74) and houses an intermediate portion of the conveyor system (20). The conveyor drive system pit (78) is downstream and adjacent to the conveyor pit (76). The conveyor drive system pit (78) houses a head section of the conveyor system (20) and a drive system (40) of the conveyor system (20). Still other suitable configurations for the pit (70) will be apparent to one with ordinary skill in the art in view of the teachings herein. For instance, in some versions, the pit (70) is elevated to position the assembly line (10) above floor level (F). In some other versions, the pit (70) inclined to position the assembly line (10) at an angle. It should also be noted that the pit (70) is merely optional such that the pit (70) is removed in some versions.

The multi-strand flat top conveyor system (20) comprises a first side conveyor chain (22), a second side conveyor chain (24), and a middle conveyor chain (26) positioned between the first side conveyor chain (22) and the second side conveyor chain (24), as shown in FIGS. 2B-5. Of course, any suitable number of chains (22, 24, 26) may be used. Chains (22, 24, 26) can be made from a plastic material with steel links embedded within the plastic material, but any other suitable material can be used. In the illustrated embodiment, the first side conveyor chain (22) is positioned to receive the right wheels of a vehicle and the second side conveyor chain (24) is positioned to receive the left wheels of a vehicle, as best seen in FIGS. 10-11. The middle conveyor chain (26) is positioned to minimize gaps between the chains (22, 24, 26). Each chain (22, 24, 26) may be about 3 feet 4 inches in width such that the conveyor system (20) is about 10 feet in width, but other suitable dimensions may be used. In the illustrated embodiment, each chain (22, 24, 26) ends at the head section of the assembly line (10) at the substantially same point. In some other versions, one or more chains (22, 24, 26) have different lengths and may end at different points at the head section of the assembly line (10).

As best seen in FIG. 3, each conveyor chain (22, 24, 26) is positioned substantially horizontal relative to the floor level (F). In some other versions, one or more chains (22, 24, 26) may be positioned at an angle relative to the floor level (F). In the present embodiment, the chains (22, 24, 26) are configured to run at substantially the same speed to provide a wide flat top conveyor portion across the three chains (22, 24, 26). In some other versions, the chains (22, 24, 26) can be driven at different speeds such that one or more chains (22, 24, 26) run at a different speed. Additionally, or alternatively, one or more chains (22, 24, 26) can be driven in different directions. In the present embodiment, the chains (22, 24, 26) are driven by a single motor, but more than one motor can be used. Other configurations for the chains (22, 24, 26) will be apparent to one with ordinary skill in the art in view of the teachings herein.

Figure 2B:
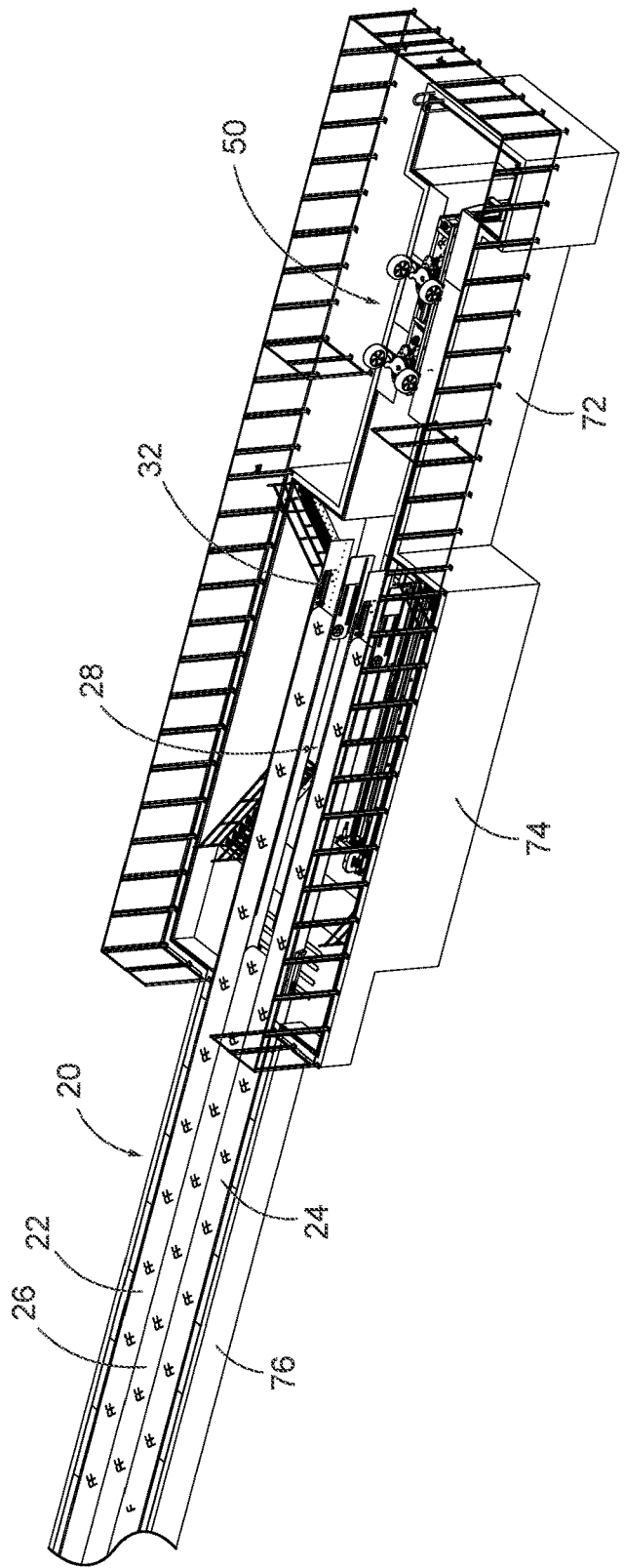
FIG. 2B depicts a top perspective view of a tail section of the multi-strand flat top conveyor system with the decking shuttle of FIG. 2A.
Figure 4:
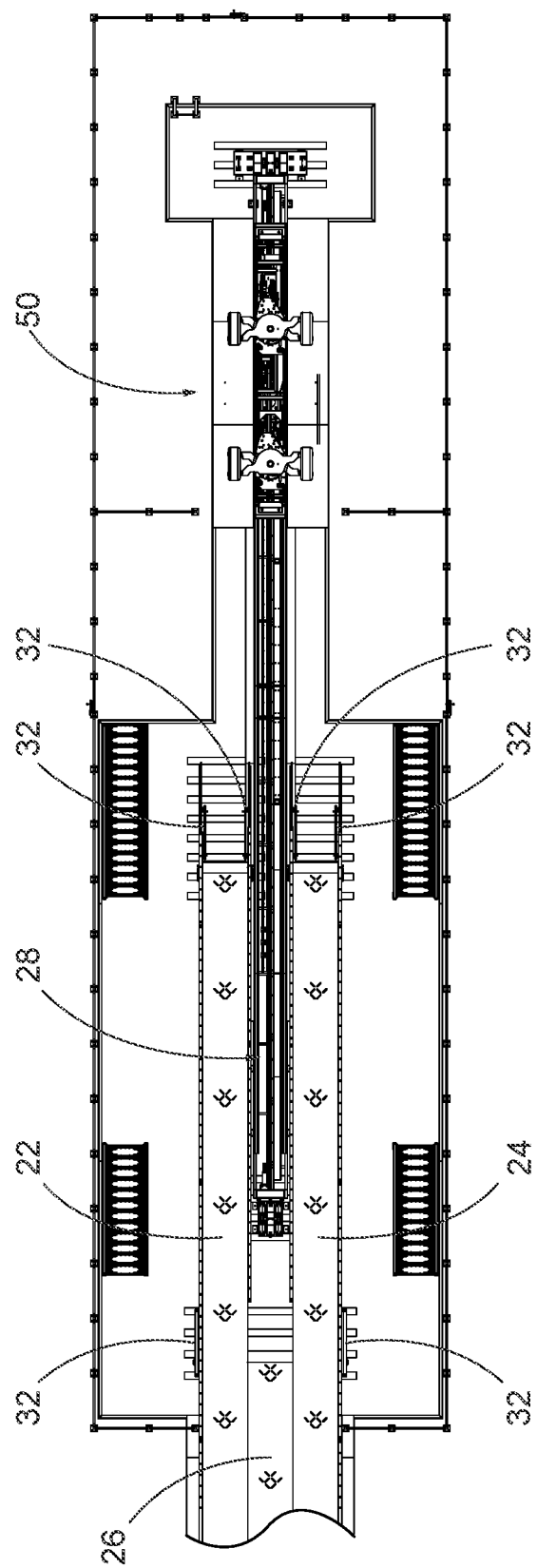
FIG. 4 depicts a top plan view of the tail section of the multi-strand flat top conveyor system with the decking shuttle of FIG. 2A.
Figure 5:
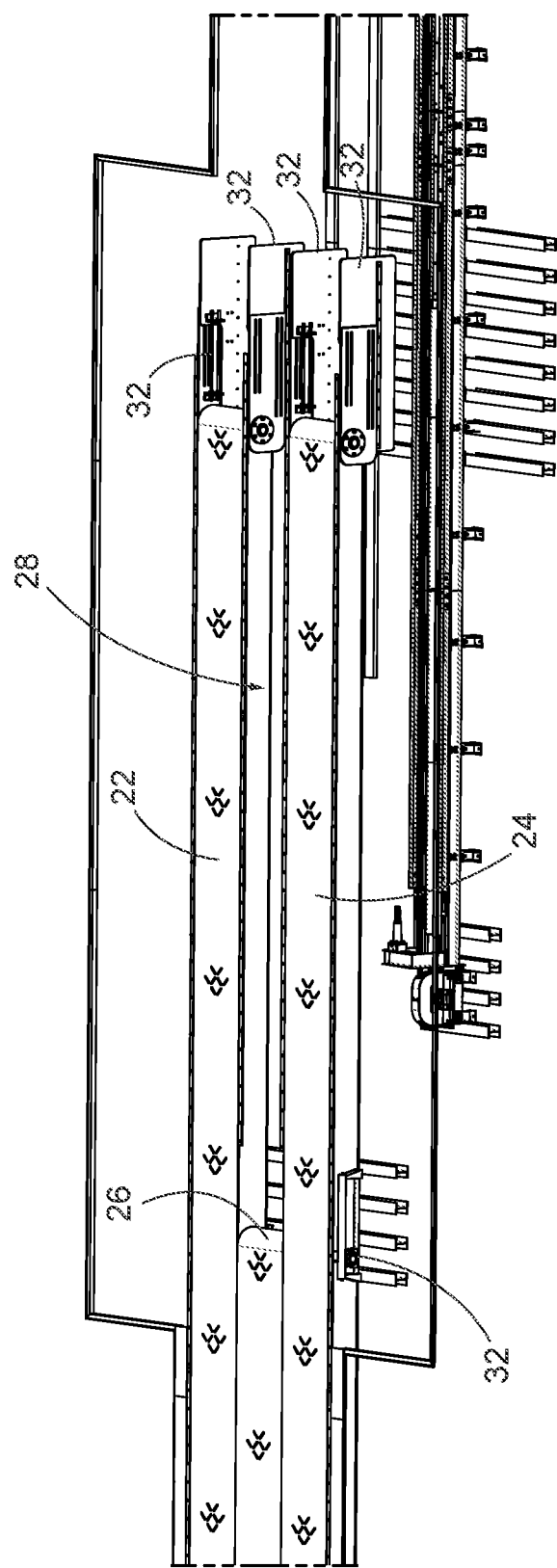
FIG. 5 depicts a top perspective view of the tail section of the multi-strand flat top conveyor system of FIG. 2A.

As shown in FIGS. 2B and 4-5, the first side conveyor chain (22) and the second side conveyor chain (24) extend further upstream than the middle conveyor chain (26) to form a recess (28) between the first side conveyor chain (22) and the second side conveyor chain (24) at the tail section of the conveyor system (20). The recess (28) is configured to receive the transfer device (50) to allow the transfer of a vehicle from the transfer device (50) to the conveyor system (20), as will be discussed in more detail below.

Figure 7:
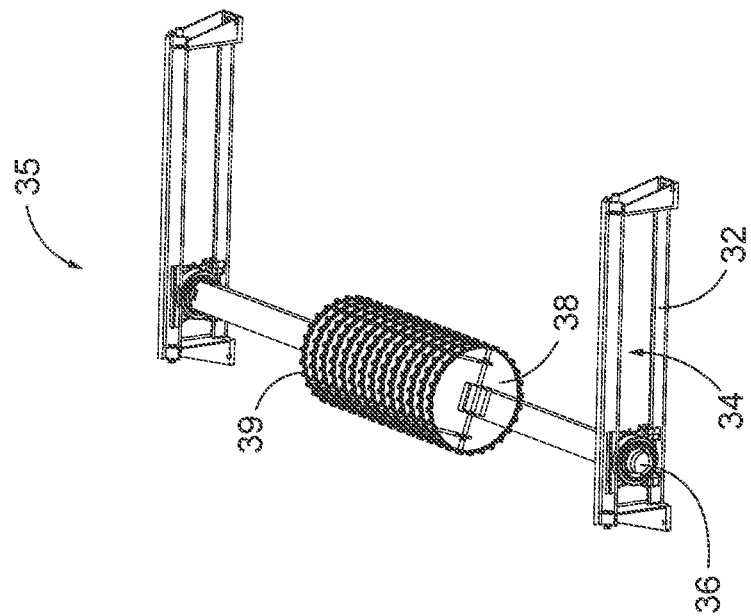
FIG. 7 depicts a top perspective view of a tail shaft assembly of the conveyor support system of FIG. 6.
Figure 6:
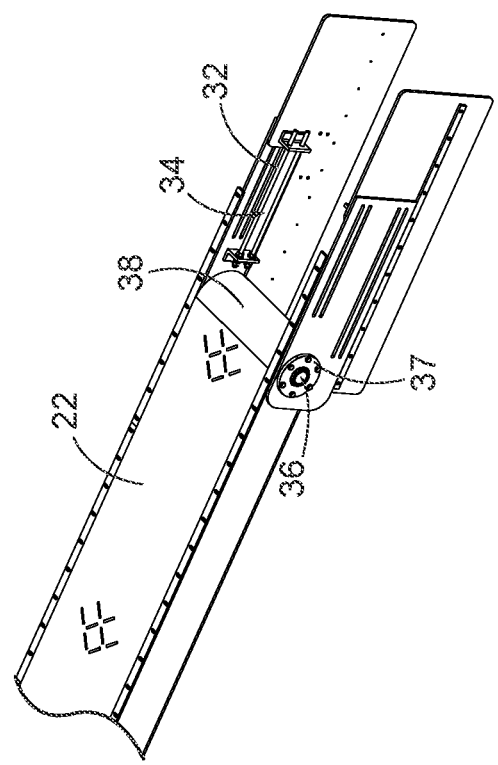
FIG. 6 depicts a top perspective view of a conveyor support system of the multi-strand flat top conveyor system of FIG. 5.

The tail section of each conveyor chain (22, 24, 26) comprises a pair of supports (32) to receive a shaft assembly (35), as shown in FIGS. 6 and 7. As best seen in FIG. 7, each support (32) defines an opening (34) extending longitudinally through the support (32) that is configured to receive a bearing housing (37). Each bearing housing (37) comprises bearings and receives the shaft assembly (35). As shown in FIG. 7, the shaft assembly (35) comprises a shaft (36) extending through a sprocket (38). The bearing housings (37) allow the shaft (36) to rotate relative to the support (32). The tail section of each conveyor chain (22, 24, 26) is looped around the sprocket (38), as shown in FIG. 6. The sprocket (38) comprises a plurality of teeth (39) that may grip the conveyor chains (22, 24, 26) to reduce and/or prevent the conveyor chains (22, 24, 26) from slipping on the sprocket (38). The teeth (39) may extend across the entire width of the sprocket (38), or the teeth (39) may extend across only a portion of the sprocket (38). As shown in FIG. 6, the bearing housing (37) is positioned downstream within the opening (34) of the support (32). After prolonged use of the conveyor system (20), a conveyor chain (22, 24, 26) may experience stretching. Accordingly, each bearing housing (37) at the end of the conveyor chain (22, 24, 26) may be translated upstream within the opening (34) of the support (32) to tighten the conveyor chain (22, 24, 26). Other configurations for supporting the conveyor chains (22, 24, 26) will be apparent to one with ordinary skill in the art in view of the teachings herein. For instance, the supports (32) may be provided at the head section of the conveyor chains (22, 24, 26) instead of the tail section of the conveyor chains (22, 24, 26).

Figure 8:
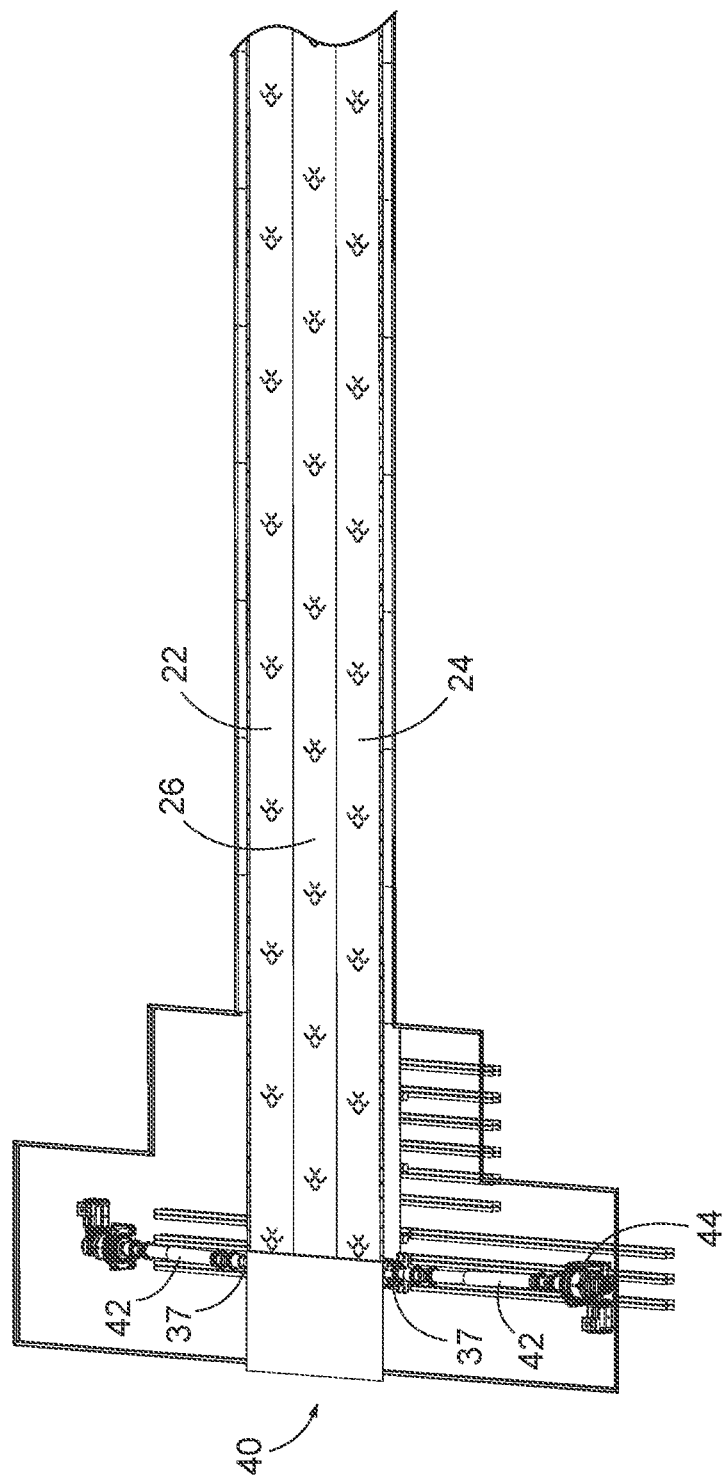
FIG. 8 depicts a top perspective view of a conveyor head section and drive system of the multi-strand flat top conveyor system of FIG. 2A.

FIGS. 8-9 show the drive system (40) at the head section of the conveyor chains (22, 24, 26). In the illustrated embodiment, the drive system (40) comprises a shaft assembly (35), a pair of drive shafts (42), a primary motor (44), and a secondary motor (46). The shaft assembly (35) is similar to the shaft assembly (35) described above at the tail section of the conveyor chains (22, 24, 26). Each drive shaft (42) is coupled with an end of the shaft (36) of the shaft assembly (35). The drive shaft (42) then extends outward from the end of the shaft (36). One of the drive shafts (42) is coupled with the primary motor (44). The primary motor (44) is configured to drive the shaft (36) of the shaft assembly (35) to thereby drive all three chains (22, 24, 26) of the conveyor system (20). Of course, any other suitable number of motors (44) can be used. The other drive shaft (42) is coupled to the secondary motor (46). Secondary motor (46) can be used to drive the chains (22, 24, 26) if the primary motor (44) is deactivated and/or inoperable. It should be noted that the secondary motor (46) is merely optional. A bearing housing (37) is positioned on each shaft (42) on each side of the conveyor chains (22, 24, 26) to allow the shafts (42) to rotate relative to the floor and/or a support. Other suitable configurations of the drive system (40) will be apparent to one with ordinary skill in the art in view of the teachings herein. For instance, the drive system (40) may be positioned at the tail section of the conveyor system (20) instead of the head section.

Figure 12:
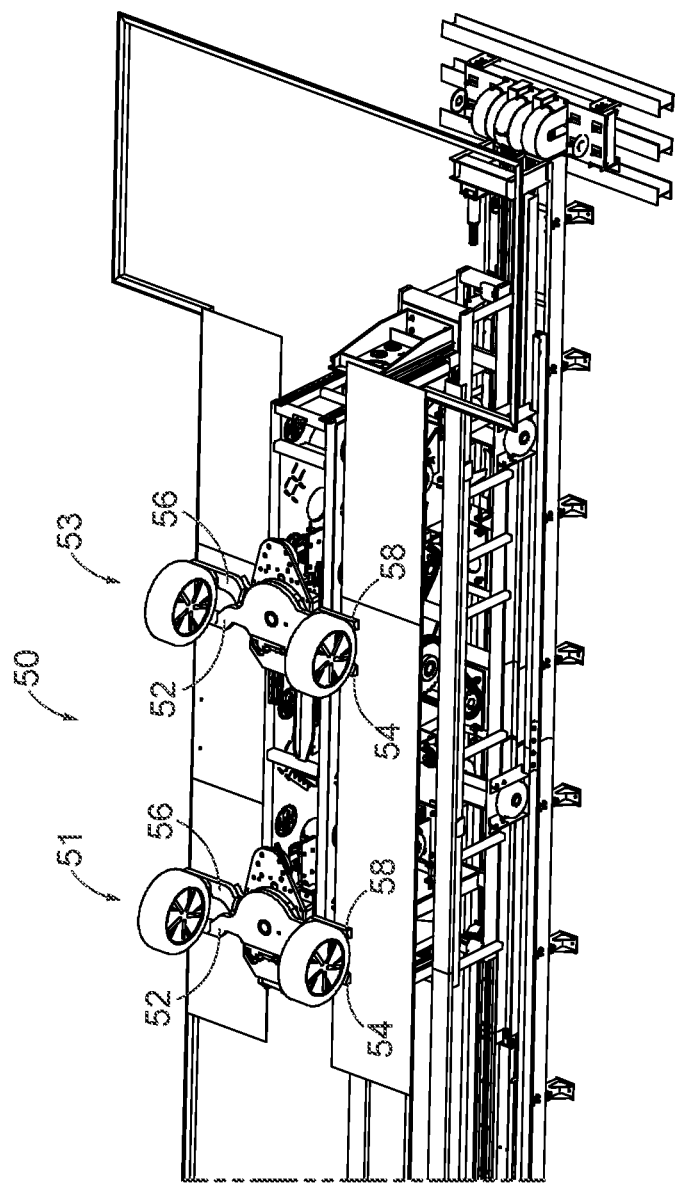
FIG. 12 depicts a top perspective view of the decking shuttle of FIG. 2A.
Figure 13:
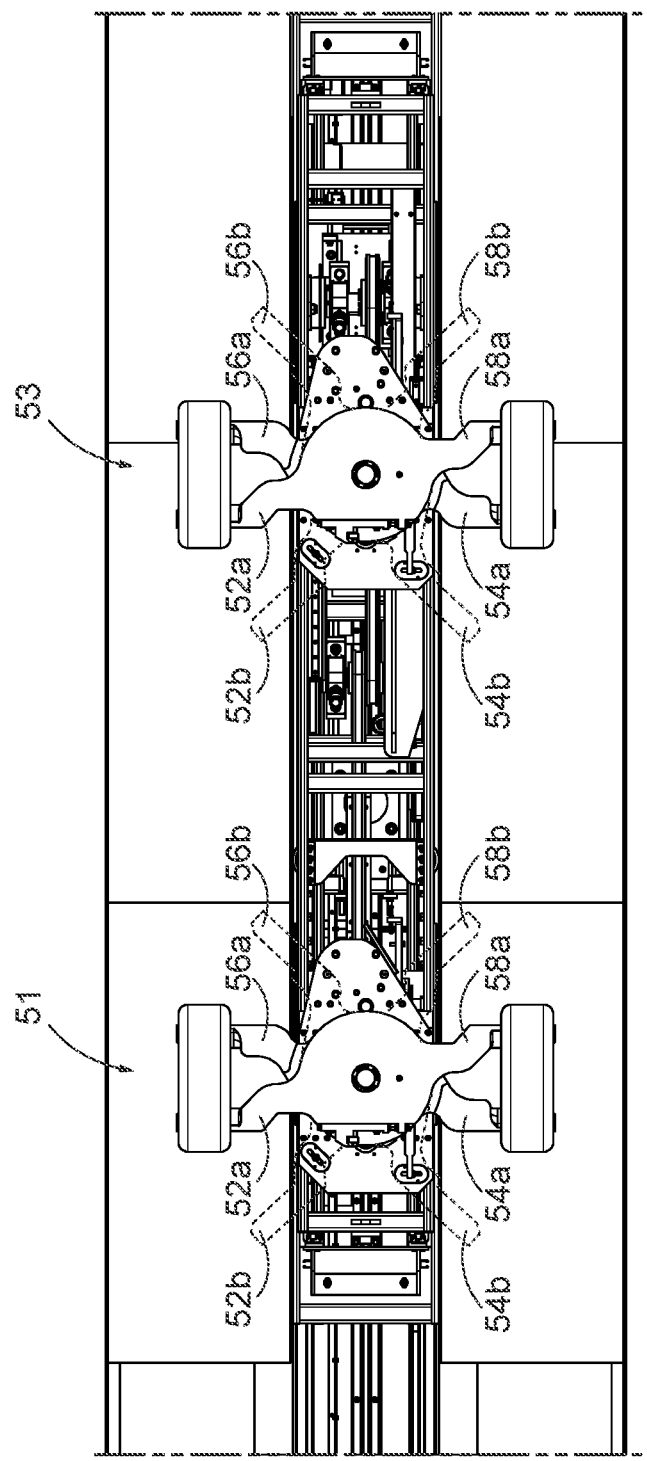
FIG. 13 depicts a top plan view of the decking shuttle of FIG. 2A.

One embodiment of the transfer device (50) is shown in more detail in FIGS. 12-13. This embodiment of the transfer device (50) comprises a decking shuttle, also known as a lift and carry shuttle or a carrier shuttle, having a pair of arm assemblies (51, 53) positioned longitudinally relative to each other. Accordingly, an upstream arm assembly (53) is configured to receive the rear wheels of a vehicle and a downstream arm assembly (51) is configured to receive the front wheels of a vehicle. Each arm assembly (51, 53) comprises a pair of front arms (52, 54) and a pair of rear arms (56, 58). As best seen in FIG. 11, each arm (52, 54, 56, 58) is configured to selectively rotate from a closed position to an open position. For instance, in the closed position, each arm (52, 54, 56, 58) extend transversely across the shuttle to support a vehicle by the wheels such that the right front arm (52) of the downstream arm assembly (51) at position (52a) supports the front of the front right wheel of a vehicle, the right rear arm (56) at position (56a) supports the rear of the front right wheel of a vehicle, the left front arm (54) at position (54a) supports the front of the front left wheel of a vehicle, and the left rear arm (58) at position (58a) supports the rear of the front left wheel of a vehicle, while the right front arm (52) of the upstream arm assembly (53) at position (52a) supports the front of the rear right wheel of a vehicle, the right rear arm (56) at position (56a) supports the rear of the rear right wheel of a vehicle, the left front arm (54) at position (54a) supports the front of the rear left wheel of a vehicle, and the left rear arm (58) at position (58a) supports the rear of the rear left wheel of a vehicle. When the arm assemblies (51, 53) of the shuttle are moved to the open position, each arm (52, 54, 56, 58) rotates inwardly within the shuttle to position (52b, 54b, 56b, 58b) to remove support of the vehicle from the shuttle and transition the support of the vehicle to the conveyor chains (22, 24).

Figure 14:
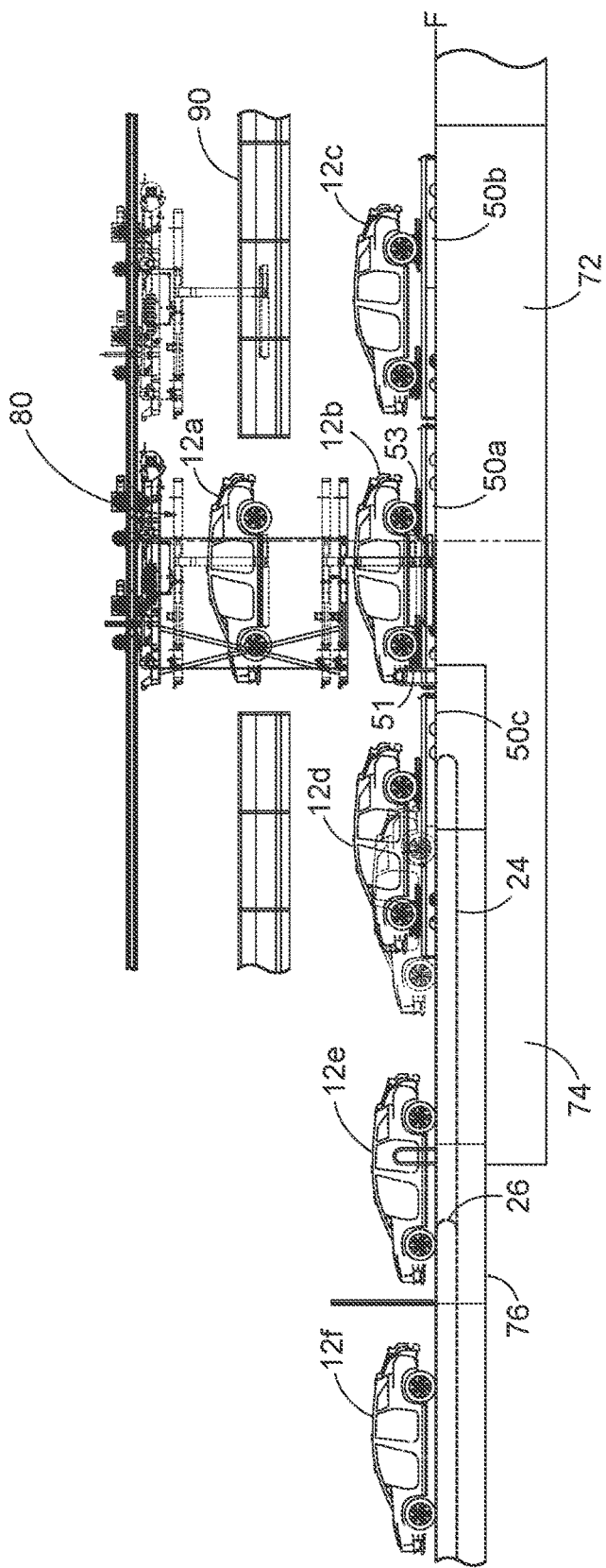
FIG. 14 depicts a schematic of a vehicle being processed by the assembly line of FIG. 2A.

An assembly of a vehicle (12) is depicted in FIG. 14. A lift carrier (80) is used to provide underneath support of the carriage of a vehicle (12) as shown at (12a). The lift carrier (80) can lower the vehicle (12) onto the transfer device (50) as shown at (12b) and (50a). The arms (52, 54, 56, 58) of the arm assemblies (51, 53) are in a closed position such that the arms (52, 54, 56, 58) are aligned with the wheels of the vehicle (12) to support the vehicle (12) by the wheels. The lift carrier (80) can continue to lower below the arm assemblies (51, 53) of the transfer device (50) to transition the support of the vehicle (12) from the lift assembly (80) to the shuttle. Once the vehicle (12) is transitioned from the lift carrier (80) to the shuttle, the shuttle is driven downstream towards the conveyor system (20). After the shuttle is moved downstream, past the lift carrier (80), the empty lift carrier (80) can be raised to receive another vehicle.

As the transfer device (50) moves downstream, the transfer device (50) is driven to match speed with the conveyor system (20). The body of the shuttle then drives into the recess (28) between the side conveyor chains (22, 24) as shown as (50*c*). This aligns the arm assemblies (51, 53) of the shuttle above the side conveyor chains (22, 24). The arm assemblies (51, 53) can then be pivoted to the open position to remove the arm assemblies (51, 53) from the wheels of the vehicle (12) at (12*d*) to position the wheels of the vehicle (12) on the side conveyors (22, 24). As the arm assemblies (51, 53) are opened, the transfer device (50) can be lowered to help transition the vehicle (12) from the transfer device (50) to the conveyor chains (22, 24). Once, the vehicle is transitioned to the conveyor chains (22, 24), the vehicle can be moved downstream by the conveyor chains (22, 24) to the wide flat top conveyor portion with conveyor chains (22, 24, 26) for further assembly. Other configurations for the transfer device (50) will be apparent to one with ordinary skill in the art in view of the teachings herein.

Figure 16:
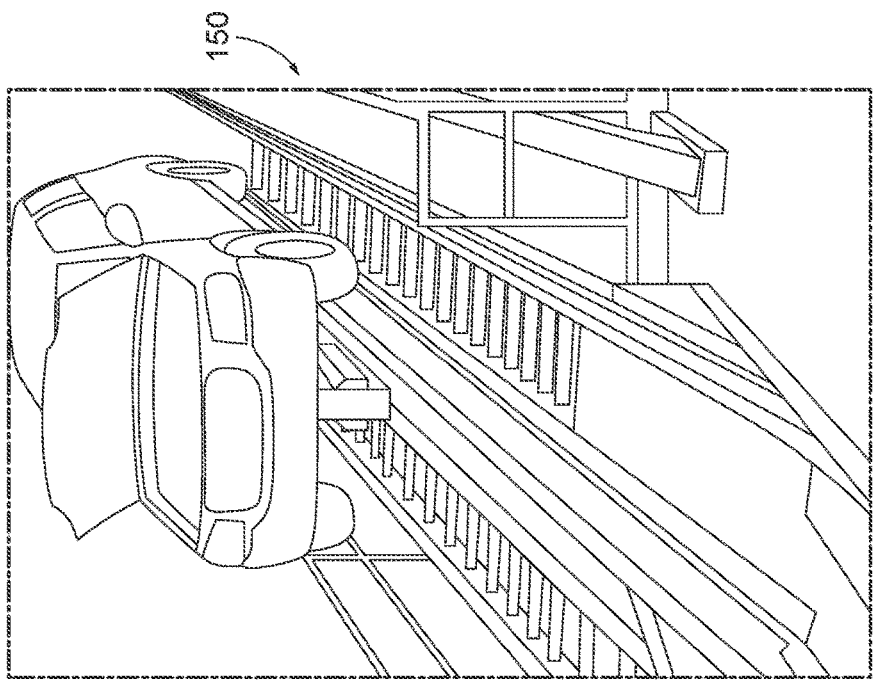
FIG. 16 depicts a front view of the inverted conveyor system of FIG. 15.
Figure 15:
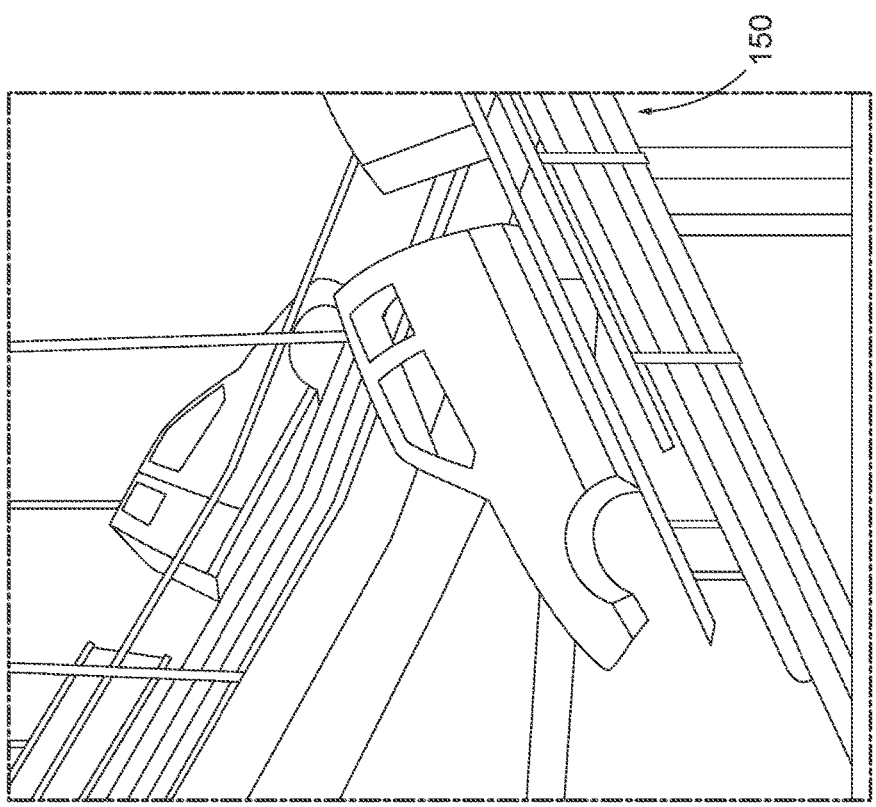
FIG. 15 depicts a side elevational view of an inverted conveyor system.

For instance, FIGS. 15-16 show an inverted and power free (IPF) conveyor system (150) that can be used as a transfer device (50) instead of the shuttle. The IPF conveyor system (150) is similar to the shuttle in that the IPF conveyor system (150) supports a vehicle from underneath the carriage. The IPF conveyor system (150) is inverted relative to a floor level such that a vehicle is lowered as the vehicle moves downstream along the IPF conveyor system (150). Such a IPF conveyor system (150) can be used with the multi-strand flat top conveyor system (20) as described above to transfer a vehicle from underneath carriage support to wheel support.

Figure 17:
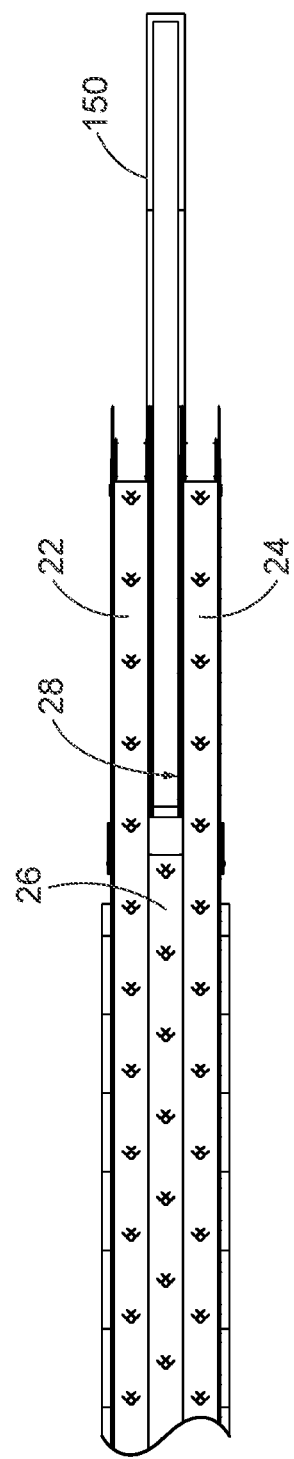
FIG. 17 depicts a top plan view of another assembly line with an inverted conveyor system and a multi-strand flat top conveyor system.

FIGS. 17-18 show an IPF conveyor system (150) positioned upstream of a multi-strand conveyor system (20) such that the downstream end of the IPF conveyor system (150) is inserted within the recess (28) of the multi-strand conveyor system (20). Accordingly, the IPF conveyor system (150) is driven to match speed with the conveyor system (20). As a vehicle moves downstream on the IPF conveyor system (150), the wheels of the vehicle are aligned with the side conveyor chains (22, 24) of the conveyor system (20). The vehicle is then lowered by the IPF conveyor system (150) onto the conveyor system (20). The IPF conveyor system (150) can then release the vehicle such that the vehicle is then supported by the conveyor system (20). Once, the vehicle is transitioned to the conveyor chains (22, 24), the vehicle can be moved downstream by the conveyor chains (22, 24) to the wide flat top conveyor portion with conveyor chains (22, 24, 26) for further assembly. Still other configurations for using the IPF conveyor system (150) with the multi-strand conveyor system (20) will be apparent to one with ordinary skill in the art in view of the teachings herein.

Example 1

In a first example, a vehicle production assembly line (10) comprises a flat top conveyor system (20) configured to support a vehicle, wherein the flat top conveyor system (20) comprises a first side conveyor chain (22), a second side conveyor chain (24), and a middle conveyor chain (26) positioned between the first side conveyor chain (22) and the second side conveyor chain (24).

Example 2

In a second example, a vehicle production assembly line (10) comprises a transfer device (50) and a flat top conveyor system (20) positioned downstream from the transfer device (50), wherein the flat top conveyor system (20) comprises a first side conveyor chain (22), a second side conveyor chain (24), and a middle conveyor chain (26) positioned between the first side conveyor chain (22) and the second side conveyor chain (24), wherein the transfer device (50) is configured to transfer support of a vehicle from the transfer device (50) to the flat top conveyor system (20).

Example 3

In a third example, a process for assembling a vehicle along an assembly line (10) comprises positioning a vehicle on a flat top conveyor system (20), wherein at least one wheel of the vehicle is positioned on a first side conveyor chain (22) of the flat top conveyor system (20), wherein at least another wheel of the vehicle is positioned on a second side conveyor chain (24) of the flat top conveyor system (20), wherein a body of the vehicle is positioned above a middle conveyor chain (26) of the flat top conveyor system (20); and driving the conveyor system (20) to move the vehicle downstream along the assembly line (10).

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A vehicle production assembly comprises a conveyor system configured to support a vehicle, wherein the conveyor system comprises a first side conveyor chain, a second side conveyor chain, and a middle conveyor chain positioned between the first side conveyor chain and the second side conveyor chain, wherein the first side conveyor chain, the second side conveyor chain, and the middle conveyor chain are laterally aligned with each other to form a substantially continuous conveyor surface extending along a top surface of each of the first side conveyor chain, the second side conveyor chain, and the middle conveyor chain such that the conveyor surface has a width that is greater than a width of the vehicle to support each wheel of the vehicle on the top surface of the conveyor surface.

2. The vehicle production assembly of claim 1, further comprising one motor coupled to each of the first side conveyor chain, the second side conveyor chain, and the middle conveyor chain via a shaft assembly.

3. The vehicle production assembly of claim 2, wherein the motor is operable to mechanically synchronize the first side conveyor chain, the second side conveyor chain, and the middle conveyor chain.

4. The vehicle production assembly of claim 1, wherein the first side conveyor chain is configured to receive a first pair of wheels of the vehicle, and wherein the second side conveyor chain is configured to receive a second pair of wheels of the vehicle.

5. The vehicle production assembly of claim 1, wherein at least one of the first side conveyor chain, the second side conveyor chain, and the middle conveyor chain is inclined.

6. The vehicle production assembly of claim 1, wherein the middle conveyor chain is positioned between the first side conveyor chain and the second side conveyor chain to minimize gaps between the middle conveyor chain the first and second side conveyor chains.

7. The vehicle production assembly of claim 1, wherein the first side, the second side, and the middle conveyor chains are laterally aligned to evenly end at a head section of the conveyor system.

8. The vehicle production assembly of claim 1, wherein the middle conveyor chain comprises a shorter length than the first and second side conveyor chains such that a recess is formed between the first and second side conveyor chains at a tail section of the conveyor system.

9. The vehicle production assembly of claim 1, further comprising a transfer device operable to transfer a vehicle from an undercarriage support to a wheel support on the conveyor system.

10. The vehicle production assembly of claim 9, wherein the transfer device comprises a decking shuttle, wherein the decking shuttle comprises a pair of arm assemblies selectively rotatable from an open position to a closed position.

11. The vehicle production assembly of claim 10, wherein the pair of arm assemblies are longitudinally aligned such that a first arm assembly of the pair of arm assemblies is configured to receive the front wheels of the vehicle and a second arm assembly of the pair of arm assemblies is configured to receive the rear wheels of the vehicle.

12. The vehicle production assembly of claim 9, wherein the transfer device comprises an inverted and power free conveyor system.

13. The vehicle production assembly of claim 9, further comprising a pit housing the conveyor system and the transfer device such that the conveyor system and the transfer device are horizontally aligned.

14. The vehicle production assembly of claim 13, wherein the conveyor system and the transfer device are aligned at floor level.

15. A method for assembling a vehicle along an assembly line comprises the steps of:
    positioning a vehicle on a conveyor system, wherein at least one wheel of the vehicle is positioned on a top surface of a first side conveyor chain of the conveyor system, wherein at least another wheel of the vehicle is positioned on a top surface of a second side conveyor chain of the conveyor system, wherein a body of the vehicle is positioned above a top surface of a middle conveyor chain of the conveyor system; and
    driving the conveyor system to move the vehicle downstream along the assembly line.

16. The method of claim 15, further comprising driving the first side, the second side, and the middle conveyor chains at substantially the same speed.

17. The method of claim 15, further comprising driving the first side, the second side, and the middle conveyor chains with a single motor.

18. The method of claim 15, further comprising transferring the vehicle to the conveyor system with a transfer device.

19. The method of claim 18, further comprising translating the transfer device relative to the conveyor system such that the transfer device translates within a recess between the first and second side conveyor chains.

20. The method of claim 18, further comprising selectively rotating a pair of arm assemblies of the transfer device to transfer the vehicle from the transfer device to the conveyor system.

* * * * *